United States Patent
Oyadomari et al.

(10) Patent No.: US 8,190,722 B2
(45) Date of Patent: *May 29, 2012

(54) SYNCHRONIZATION OF TIMESTAMPS TO COMPENSATE FOR COMMUNICATION LATENCY BETWEEN DEVICES

(76) Inventors: Randy Oyadomari, San Jose, CA (US); Arthur Michael Lawson, Morgan Hill, CA (US)

( * ) Notice: Subject to any disclaimer, the term of this patent is extended or adjusted under 35 U.S.C. 154(b) by 1538 days.

This patent is subject to a terminal disclaimer.

(21) Appl. No.: 10/882,711

(22) Filed: Jun. 30, 2004

(65) Prior Publication Data

US 2005/0010691 A1    Jan. 13, 2005

Related U.S. Application Data

(60) Provisional application No. 60/483,993, filed on Jun. 30, 2003.

(51) Int. Cl.
*G06F 15/16* (2006.01)

(52) U.S. Cl. ........ 709/223; 709/248; 709/250; 370/301; 702/89; 710/118; 713/375; 713/400; 713/401

(58) Field of Classification Search .............. 709/250, 709/223, 248; 713/375, 400, 401; 710/118; 702/89; 370/301
See application file for complete search history.

(56) References Cited

U.S. PATENT DOCUMENTS

| | | | |
|---|---|---|---|
| 4,434,466 A * | 2/1984 | Friedli et al. | 710/244 |
| 4,484,264 A * | 11/1984 | Friedli et al. | 709/250 |
| 4,792,753 A | 12/1988 | Iwai | |
| 4,945,473 A * | 7/1990 | Holtey et al. | 703/25 |
| 5,027,297 A | 6/1991 | Garitty et al. | |
| 5,175,818 A * | 12/1992 | Kunimoto et al. | 709/250 |
| 5,452,436 A * | 9/1995 | Arai et al. | 713/375 |
| 5,517,662 A * | 5/1996 | Coleman et al. | 709/201 |
| 5,535,193 A | 7/1996 | Zhang | |
| 5,557,744 A * | 9/1996 | Kobayakawa et al. | 709/232 |
| 5,590,116 A * | 12/1996 | Zhang | 370/253 |

(Continued)

FOREIGN PATENT DOCUMENTS

GB    EP0726664 A2    8/1996

(Continued)

OTHER PUBLICATIONS

Web page: Oustanding PC, Webopedia, *Routing in the Internet*.

(Continued)

*Primary Examiner* — Krista Zele
*Assistant Examiner* — Anthony Fabbri
(74) *Attorney, Agent, or Firm* — Volentine & Whitt, PLLC (57) ABSTRACT

Protocol analyzer systems enable synchronization of timestamps and the capture of data across serially chained boxes that are used together to monitor and capture network data. Through experiment, it can be determined how long it takes to propagate a signal to each box in the chain. These values are then recorded in each box in a delay register so that each box has a recorded delay value corresponding to the time required to propagate a signal to or receive a signal from every other box. Each box applies a control signal, such as a run signal or a trigger signal, to the ports in the box only after the expiration of the delay value indicated in the delay register. The box initiating the signal has the largest delay since the other boxes need to get the signal before the boxes can begin to operate with a common counter, with successive boxes having smaller delays.

18 Claims, 5 Drawing Sheets

U.S. PATENT DOCUMENTS

| | | | |
|---|---|---|---|
| 5,666,359 | A | 9/1997 | Bennett et al. |
| 5,696,701 | A | 12/1997 | Burgess et al. ............... 714/25 |
| 5,761,424 | A | 6/1998 | Adams et al. ............... 709/217 |
| 5,768,529 | A * | 6/1998 | Nikel et al. ............... 709/232 |
| 5,812,529 | A * | 9/1998 | Czarnik et al. ............... 370/245 |
| 5,850,386 | A | 12/1998 | Anderson et al. |
| 5,884,046 | A * | 3/1999 | Antonov ............... 709/238 |
| 5,912,701 | A * | 6/1999 | Morton, Jr. ............... 348/192 |
| 6,049,545 | A | 4/2000 | Stephenson et al. |
| 6,058,116 | A | 5/2000 | Hiscock et al. |
| 6,098,157 | A | 8/2000 | Hsu et al. ............... 711/157 |
| 6,141,701 | A * | 10/2000 | Whitney ............... 710/5 |
| 6,199,169 | B1 * | 3/2001 | Voth ............... 713/400 |
| 6,243,834 | B1 | 6/2001 | Garrett |
| 6,266,789 | B1 | 7/2001 | Bucher et al. |
| 6,335,931 | B1 * | 1/2002 | Strong et al. ............... 370/390 |
| 6,345,302 | B1 * | 2/2002 | Bennett et al. ............... 709/236 |
| 6,360,262 | B1 * | 3/2002 | Guenthner et al. ............... 709/226 |
| 6,366,583 | B2 * | 4/2002 | Rowett et al. ............... 370/401 |
| 6,427,171 | B1 * | 7/2002 | Craft et al. ............... 709/230 |
| 6,427,173 | B1 * | 7/2002 | Boucher et al. ............... 709/238 |
| 6,434,620 | B1 * | 8/2002 | Boucher et al. ............... 709/230 |
| 6,490,631 | B1 * | 12/2002 | Teich et al. ............... 709/250 |
| 6,507,923 | B1 | 1/2003 | Wall et al. |
| 6,535,926 | B1 * | 3/2003 | Esker ............... 709/248 |
| 6,597,691 | B1 | 7/2003 | Anderson |
| 6,633,835 | B1 | 10/2003 | Moran |
| 6,636,518 | B1 * | 10/2003 | Liencres ............... 370/395.7 |
| 6,639,957 | B2 * | 10/2003 | Cahill-O'Brien et al. ............... 375/354 |
| 6,654,356 | B1 * | 11/2003 | Eidson et al. ............... 370/303 |
| 6,665,725 | B1 | 12/2003 | Dietz et al. |
| 6,724,729 | B1 | 4/2004 | Sikdar |
| 6,735,629 | B1 | 5/2004 | Cafarelli |
| 6,751,676 | B2 * | 6/2004 | Fukuhara ............... 709/250 |
| 6,757,725 | B1 * | 6/2004 | Frantz et al. ............... 709/223 |
| 6,789,182 | B1 | 9/2004 | Brothers et al. |
| 6,791,953 | B2 * | 9/2004 | Ogawa et al. ............... 370/301 |
| 6,793,539 | B1 | 9/2004 | Lee et al. |
| 6,925,052 | B1 | 8/2005 | Reynolds |
| 6,941,482 | B2 * | 9/2005 | Strong ............... 713/400 |
| 7,010,607 | B1 | 3/2006 | Bunton |
| 7,010,712 | B1 * | 3/2006 | Huang et al. ............... 713/400 |
| 7,092,407 | B2 | 8/2006 | Ruhnow |
| 7,120,121 | B2 | 10/2006 | Sikdar |
| 7,120,680 | B1 | 10/2006 | Higgins |
| 7,222,313 | B2 * | 5/2007 | Bullis et al. ............... 716/3 |
| 7,228,348 | B1 | 6/2007 | Farley |
| 7,281,167 | B2 * | 10/2007 | Dube ............... 714/39 |
| 7,492,061 | B2 * | 2/2009 | Beyers et al. ............... 307/85 |
| 7,649,912 | B2 * | 1/2010 | Balasubramanian et al. 370/509 |
| 2002/0138675 | A1 * | 9/2002 | Mann ............... 710/61 |
| 2003/0014544 | A1 * | 1/2003 | Pettey ............... 709/249 |
| 2003/0177497 | A1 | 9/2003 | Macrae |
| 2003/0195958 | A1 | 10/2003 | Byron |
| 2003/0225482 | A1 | 12/2003 | Topka |
| 2004/0013117 | A1 * | 1/2004 | Hendel et al. ............... 370/394 |
| 2004/0028038 | A1 | 2/2004 | Anderson |
| 2004/0148376 | A1 | 7/2004 | Rangan |
| 2004/0190502 | A1 | 9/2004 | Sharma |
| 2005/0010691 | A1 | 1/2005 | Oyadomari et al. |
| 2005/0060402 | A1 * | 3/2005 | Oyadomari et al. ............... 709/224 |
| 2005/0060413 | A1 * | 3/2005 | Oyadomari et al. ............... 709/227 |
| 2005/0114663 | A1 * | 5/2005 | Cornell et al. ............... 713/168 |
| 2005/0114697 | A1 * | 5/2005 | Cornell et al. ............... 713/200 |
| 2005/0114710 | A1 * | 5/2005 | Cornell et al. ............... 713/201 |
| 2005/0278760 | A1 | 12/2005 | Dewar |
| 2006/0139854 | A1 * | 6/2006 | Beyers et al. ............... 361/600 |
| 2007/0081549 | A1 * | 4/2007 | Cicchetti et al. ............... 370/447 |
| 2007/0189171 | A1 * | 8/2007 | Abrahams ............... 370/241 |
| 2007/0253349 | A1 * | 11/2007 | Light et al. ............... 370/276 |
| 2008/0013467 | A1 * | 1/2008 | Light et al. ............... 370/276 |
| 2008/0014879 | A1 * | 1/2008 | Light et al. ............... 455/130 |
| 2008/0034120 | A1 | 2/2008 | Oyadomari et al. |
| 2008/0075103 | A1 * | 3/2008 | Noble et al. ............... 370/429 |
| 2008/0126874 | A1 * | 5/2008 | Oyadomari et al. ............... 714/39 |
| 2008/0253293 | A1 * | 10/2008 | Beyers ............... 370/242 |

FOREIGN PATENT DOCUMENTS

WO      WO 01/52400 A1      7/2002

OTHER PUBLICATIONS

Web page: Internetweek.com, Schultz, Keith, *A Complete Solution, Enterasys Networks proves its mettle in enterprise-class switching*, Jan. 22, 2001.
Web page: Marvell Press Release, *Galileo Announces New High-Performance 240-port Ethernet Switch Reference Design*, 1999.
U.S. Appl. No. 10/238,358, Apr. 26, 2005, Notice of Allowance.
U.S. Appl. No. 10/881,620, Jul. 23, 2008, Office Action.
U.S. Appl. No. 10/882,711, Apr. 28, 2008, Office Action.
U.S. Appl. No. 10/881,620, filed Jun. 30, 2004, Oyadomari et al.
U.S. Appl. No. 10/882,711, filed Jun. 30, 2004, Oyadomari et al.
U.S. Appl. No. 10/881,620, Jan. 9, 2009, Office Action.
U.S. Appl. No. 10/881,620, Aug. 5, 2009, Office Action.
U.S. Appl. No. 10/868,631, Sep. 5, 2008, Office Action.
U.S. Appl. No. 10/868,631, Jun. 4, 2009, Notice of Allowance.
U.S. Appl. No. 10/881,620, Jun. 22, 2010, Advisory Action dated Jun. 22, 2010.

* cited by examiner

SYNCHRONIZATION OF TIMESTAMPS TO COMPENSATE FOR COMMUNICATION LATENCY BETWEEN DEVICES

CROSS-REFERENCE TO RELATED APPLICATIONS

This application claims the benefit of U.S. Provisional Application No. 60/483,993, filed Jun. 30, 2003, which is hereby incorporated herein by reference.

BACKGROUND OF THE INVENTION

1. The Field of the Invention

The present invention relates generally to protocol analyzer systems. More particularly, the present invention relates to methods and systems to synchronize timestamps and the capture of data across serially chained boxes that are used together to monitor and capture network data.

2. The Relevant Technology

Computer and data communications networks continue to develop and expand due to declining costs, improved performance of computer and networking equipment, and increasing demand for communication bandwidth. Communications networks, including for example, wide area networks ("WANs"), local area networks ("LANs"), and storage area networks ("SANs") allow increased productivity and utilization of distributed computers or stations through the sharing of resources, the transfer of voice and data, and the processing of voice, data, and related information at the most efficient locations. Moreover, as organizations have recognized the economic benefits of using communications networks, network applications such as electronic mail, voice and data transfer, host access, and shared and distributed databases are increasingly used as a means to increase user productivity. This increased demand, together with the growing number of distributed computing resources, has resulted in a rapid expansion of the number of installed networks.

As the demand for networks has grown, network technology has grown to include many different physical configurations. Examples include Gigabit Ethernet, Fiber Distributed Data Interface ("FDDI"), Fibre Channel, and InfiniBand networks. These and the many other types of networks that have been developed typically utilize different cabling systems, different bandwidths and typically transmit data at different speeds. In addition, each of the different network types has different sets of standards, referred to as protocols, which set forth the rules for accessing the network and for communicating among the resources on the network.

Typically, transmissions between two network connected devices are passed through a hierarchy of protocol layers at each of the connected devices. Each layer in the first network connected device essentially carries on a conversation with a corresponding layer in the second network connected device, in accordance with an established protocol that defines the rules of communication between the layers.

As communication networks have increased in number, size and complexity however, they have become more likely to develop a variety of problems that are increasingly difficult to diagnose and resolve. Moreover, the demands for network operational reliability and increased network capacity, for example, emphasize the need for adequate diagnostic and remedial systems, methods and devices.

Exemplary causes of network performance problems include the transmission of unnecessarily small frames of information, inefficient or incorrect routing of information, improper network configuration and superfluous network traffic, to name just a few. Such problems are aggravated by the fact that many networks are continually changing and evolving due to growth, reconfiguration and introduction of new network typologies and protocols, as well as the use of new interconnection devices and software applications.

Consequently, as high speed data communications mature, many designs increasingly focus on reliability and performance issues. In particular, communications systems have been designed to respond to a variety of network errors and problems, thereby minimizing the occurrence of network failures and downtimes. In addition, equipment, systems and methods have been developed that allow for the testing and monitoring of the ability of a communications system to respond to and deal with specific types of error conditions on a network. In general, such equipment, systems, and methods provide the ability to selectively alter channel data, including the introduction of errors into channel data paths.

One device that is used to detect these errors is a protocol analyzer, also called a network analyzer. A protocol analyzer runs in the background of a network, capturing, examining and logging packet traffic. Protocol analyzers can, for example, be configured to watch for unusual IP addresses, time stamps and data packets, and most have a user interface for enabling the network administrator to have access to information representing the analysis performed by the protocol analyzers. Protocol analyzers are thus a fundamental and highly useful tool for testing and debugging various types of communications networks, including computing and computer storage networks. A protocol analyzer operates by capturing selected portions of data from a data stream that is transmitted via the communications network. The captured information may then be analyzed in greater detail by the protocol analyzer to extract desired information. For instance, data transmission faults or errors, or performance errors, known generally as problem conditions, may be diagnosed by examining the captured data that is related to the problem. Hacking can also be detected through a protocol analyzer.

Protocol analyzers can be transparent to a network(s) or be configured as gateways or switching networks. Regardless, they include ports (physical connections) to the networks. The ports provide connectivity to the networks and permit the protocol analyzers to receive and capture network data. The ports are often provided on a blade (or card) that is often contained in a chassis (or box) with a common backplane or bus. The box may be modular, thereby allowing multiple boxes to be mounted to a rack in a customizable and expandable system. Such multi-box protocol analyzer systems provide access to a large number of ports over numerous blades that can be used for various purposes.

The increasing numbers of ports that have been developed enable network administrators to configure protocol analyzers for use with different data links or channels as well as to be used in coordination even though the individual ports analyzers are located on different boxes. Control signals to coordinate the boxes are typically transmitted between the boxes over inter-box cables. Thus, a network administrator can send a control signal over the cables to each of the boxes to initiate a coordinated network traffic analysis.

However, the cables, or other devices, used to interconnect boxes create a data transmission latency between the boxes, resulting in boxes receiving and implementing a control signal at different times depending on their distance from the source of the control signal. Although this latency is small (i.e. microseconds), it is enough to make accurately interpreting activity across various ports over multiple boxes difficult. Accordingly, there is a continuing need for improved methods and devices for synchronously operating protocol analyzers that are configured as multi-box systems.

BRIEF SUMMARY OF THE INVENTION

The present invention relates to systems and methods wherein multiple protocol analyzer boxes, or chassis, each with individual blades and ports, are serially chained together to allow data to be captured from multiple ports in a domain that can be spread across the serially connected boxes. Control signals to coordinate the activity on each of the ports is transmitted between the boxes on dedicated lines that connect the boxes serially. Thus, boxes furthest from the starting point of the control signal receive the control signal at a not-insignificant delay.

According to the invention, boxes in the chain have programmable delays to compensate for the time required to propagate signals through the chain. Through experiment, it can be determined how long it takes to propagate a signal to the next box. The latency is predictable and can be defined in cycles or nanoseconds. Each box has a delay register that applies an event, such as a run signal or a trigger signal, to the ports in the box only after the expiration of an experimentally determined delay value. The master box has the largest delay, since all downstream boxes need to get the signal before the boxes can begin to operate with a common counter. The first slave has a relatively large delay, with successive slaves having smaller delays. This process can coordinate the operation of the boxes within a few or tens of nanoseconds instead of microseconds.

Accordingly, a first representative embodiment of the invention is a method for synchronizing activity within the ports of a domain. The method is performed in a system that includes a plurality of boxes, wherein each box includes a plurality of blades and each blade has one or more ports. First, a control signal is generated at a first box that implements a selected activity at a first port and at a second port, wherein the first port is located in a second box and the second port is located in a box other than the second box. The control is signal is then received at the second box. The first box refers to a delay register in order to select a period of time to delay before implementing the action designated by the control signal, whereby delaying the period of time designated by the delay register ensures that the selected activity is implemented at each of the first box and the second box at substantially the same time.

A second representative embodiment is a method for synchronously performing actions on each of multiple boxes in a protocol analyzer system in a computer network, wherein each box includes a plurality of blades and each blade has one or more ports. First a plurality of ports from a plurality of the boxes in the protocol analyzer system are configured into a domain, wherein at least two of the ports in the domain are located in different boxes. Next, a control signal is generated at one of the ports in the domain, the control signal operable to implement a selected activity at each port in the domain. The control signal is then propagated to each box having a port in the domain. Last, the system refers to a delay register in each box having a port in the domain in order to identify a period of time to delay before implementing the action designated by the control signal, whereby delaying the period of time designated by the delay register ensures that the selected activity is synchronously implemented at each port in the domain.

Yet another representative method for synchronously performing actions on each of multiple boxes within the protocol analyzer system is performed in a protocol analyzer system in a computer network, wherein each box includes a plurality of blades and each blade has one or more ports. The first action is configuring a sync-group from among the plurality of interconnected boxes, wherein one of the boxes in the sync group comprises a master box and the remaining boxes comprise slave boxes. Next a clock signal is generated in the master box and transmitted to each box in the sync-group, whereby each box in the sync-group has a counter that is started by the clock signal. A run signal is then (or simultaneously) generated at the master box and transmitted to each box in the sync-group, the run signal starting a domain of ports distributed over the sync-group to monitor network traffic. The final act is, at each box in the sync-group, referring to a delay register in each box in order to identify a period of time to delay before running, whereby delaying the period of time designated by the delay register ensures that each box will synchronously start running.

A representative protocol analyzer system includes a sync-group of boxes for synchronously performing protocol analysis operations. The system includes a master box that includes: a clock for generating a clock signal for propagation to each box in the sync-group; a counter for receiving the clock signal and providing time stamps to selected data stored by the protocol analyzer system; at least one blade, each blade comprising at least one port for receiving network traffic; and a delay register containing a registry of the communications delay between each box in the sync-group. The system also includes at least one slave box, each slave box including: a counter for receiving the clock signal from the master box and providing time stamps to selected data captured by the protocol analyzer system; at least one blade, each blade comprising at least one port for receiving network traffic, wherein at least one of the ports on the master box and/or slave box(es) are configured in a domain; and a delay register containing a registry of the communications delay between each box in the sync-group. The control signal that is generated at one port in the sync-group is implemented at each box according to the delay register on each box so that the action designated by the control signal is substantially synchronously implemented at each port in the domain.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE INVENTION

In general, embodiments of the invention are concerned with a system in which multiple protocol analyzer boxes, or chassis, each with individual blades and ports, are serially chained together to allow data to be captured from multiple ports in a domain that can be spread across the serially connected boxes. In particular, this invention relates to the part of the "Normal Mode" of the system by which a delay register is used to synchronize the capture of data and timestamps across serially chained boxes that are used together to monitor and capture network data.

The protocol analyzer systems include multiple boxes that are modular so that they can be interconnected. Each box includes one or blades with each blade having one or more ports, or physical connections, to a network(s). The blades include various network analysis tools, such as analyzer modules and capture buffers, which can be used in coordination to detect and capture network data of interest or perform other network analysis operations.

Each box can be connected in a serial chain to as many as two other boxes, one in the upstream direction and one in the downstream direction. The chain can then be configured into one or more sync-groups, each sync-group having a master box, zero or more slave boxes, and two end points. Each box is configured to ignore data from boxes that are not included in its sync-group. The ports of each sync-group are configured into domains that operate within the sync-group to capture data of interest. Generally, the most upstream box in a sync-group is declared to be the master, with the others being slaves. The master coordinates the start, stop, and triggering within the sync-group, with the master being responsible for synchronously starting the boxes in a run mode while any box can generate a trigger, or stop all the boxes in the chain.

Because the system in fact comprises a number of ports and analyzers distributed over multiple boxes, delays in communication between the boxes can lead to synchronization problems that make using the various ports and analyzers in coordination difficult. In order to enable the data distributed to the multiple ports to be used together to analyze network traffic, protocol analysis operations on the monitored network traffic needs to be synchronized between the boxes. In systems where all ports are in a single device, it is less complex to synchronize, because a single counter can be used for all ports. The latency in propagating signals between the multiple boxes in the chain, in the absence of the invention, can introduce errors in the range of microseconds.

According to the invention, boxes in the chain have programmable delays to compensate for the time required to propagate signals through the chain. Through experiment, it can be determined how long it takes to propagate a signal to the next box. The latency is predictable and can be defined in cycles or nanoseconds. Each box has a delay register that applies an event, such as a run signal or a trigger signal, to the ports in the box only after the expiration of a delay value. The master box has the largest delay, since all downstream boxes need to get the signal before the boxes can begin to operate with a common counter. The first slave has a relatively large delay, with successive slaves having smaller delays. This process can coordinate the operation of the boxes within a few or tens of nanoseconds instead of microseconds.

As a practical matter, the present invention is often tied to a particular hardware implementation. The particular hardware configuration discussed herein, however, is for illustrative purposes and the present invention is not necessarily limited to any specific hardware configuration. Various embodiments of the present invention may comprise a special purpose or general-purpose computer including various computer hardware, as discussed in greater detail below.

As used herein, the terms "protocol analyzer" and "network analyzer" are used interchangeably and relate to devices having hardware or software for performing network troubleshooting, monitoring, network data analysis, network performance analysis, diagnosis, traffic simulation, bit error rate testing, network jamming, or other procedures that are conventionally performed by protocol analyzers or network analyzers. Protocol analyzers and network analyzers represent examples of special-purpose computers that can perform the operations associated with the methods described herein.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

Reference will now be made to the drawings to describe various aspects of exemplary embodiments of the invention. It is to be understood that the drawings are diagrammatic and schematic representations of such exemplary embodiments, and are not limiting of the present invention, nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of network systems have not been described in particular detail in order to avoid unnecessarily obscuring the present invention.

Figure 1:
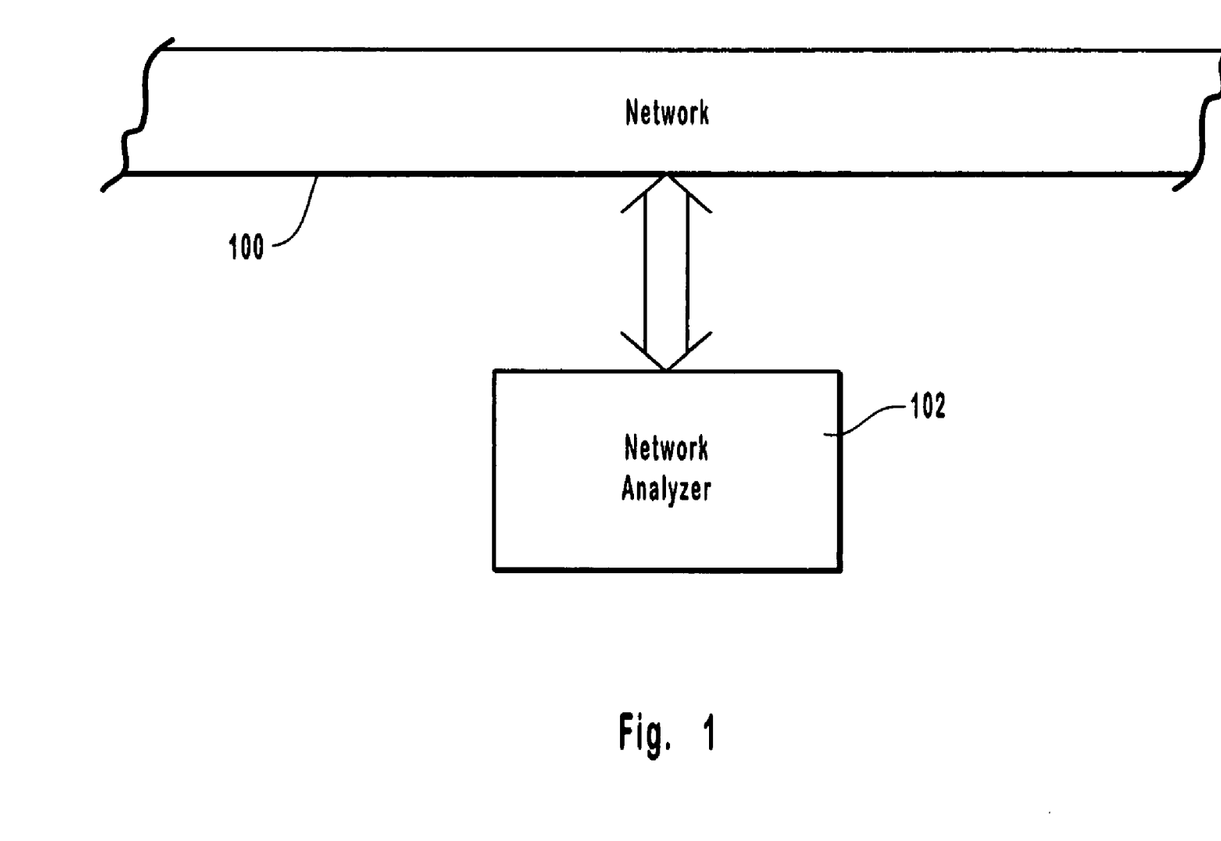
FIG. 1 is a schematic diagram that illustrates the relation of a protocol analyzer with respect to a computer network according to embodiments of the invention.

Reference is first made to FIG. 1, which shows a simplified view of a portion of a communications network, generally designated at 100. The communications network 100 may comprise, for illustrative purposes, a portion of a wide area network (WAN), a local area network (LAN), a storage area network (SAN), or other networks known in the art. The communications network 100 includes various components that communicate with one another via the network, including for example, computers, servers, and mass storage devices. Transmitted data exchanged between these components and others known in the art is referred to herein as communications traffic or network traffic. The communications traffic is transmitted via network components by processes well known in the art. The data contained in the communications traffic can comprise both physical protocols, which characterize the nature or formatting of the data, and logical protocols that include the content of the data itself.

As seen in FIG. 1, a protocol analyzer 102 is disposed in relation to the communications network 100 so as to be able to monitor communications traffic on the communications network 100. It is appreciated, however, that the protocol analyzer can be interconnected with the communications network 100 in any one of a variety of configurations, and thus is not limited to the particular configuration shown in FIG. 1. For example, the protocol analyzer may analyze communications traffic between any two nodes of the network, such as between a server and a computer terminal or a mass storage device. As explained herein, the protocol analyzer 102 may be employed to detect and debug erroneous or aberrant data communications that are included in the communications traffic. The protocol analyzer 102 may be configured to operate transparently to network 100. Alternatively, the protocol analyzer 102 can serve as part of a gateway to various devices in or portions of the network.

Figure 2:
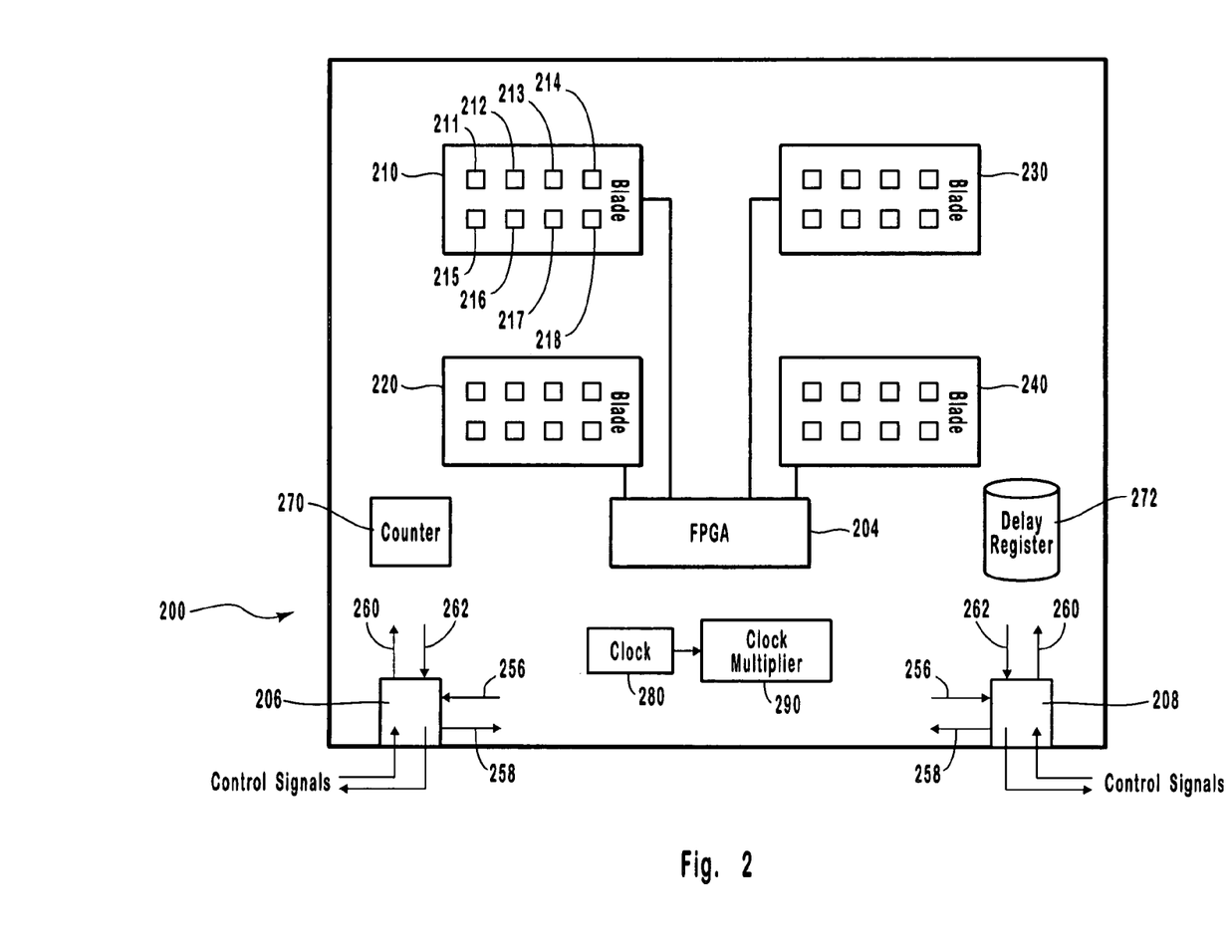
FIG. 2 is a diagram representing a box according to embodiments of the invention.

Referring now to FIG. 2, depicted is a block diagram that illustrates an exemplary protocol analyzer box 200. Generally, a box is the physical frame or structure of a computer system or other multi-component device. A box may be mounted to a rack in a modular fashion allowing multiple boxes to be mounted to the rack. Selected boxes may be configured in a sync-group for synchronous operation. Such a configuration of boxes may be configured as a protocol analyzer. Each box supports a particular number of blades and each blade supports a particular number of ports. Box 200 thus provides access to a large number of ports that can be used for various purposes, such as analyzing network communications traffic. The various blades may be electrically interconnected by a field programmable gate array (FPGA) 204, for example.

The protocol analyzer box 200 includes four blades, illustrated as blades 210, 220, 230, and 240. A blade is generally configured as a thin, energy and cost-efficient electronic circuit board that is designed to be plugged or positioned in a box with other blades like a book in a library shelf. Although the depicted embodiment contains four blades, boxes according to embodiments of the invention may have various numbers of blades, such as for example, one, two, or four. It will be appreciated by those skilled in the art that the above described physical configuration of blades in relation to boxes is by way of example only, and other configurations will be compatible, in view of the teachings herein, with the embodiments of the invention.

Blade 210 includes ports 211, 212, 213, 214, 215, 216, 217, and 218. A port is generally a specific place on a networked device for being physically connected to some other device, usually with a socket and plug of some kind. It will be understood that when ports are referred to herein that additional software and/or hardware, such as analyzer modules and capture buffers, are in communication with the port to effect the desired network analysis and data capture. Thus, the ports 211, 212, 213, 214, 215, 216, 217, and 218 physically connect to the transmission medium of the network and can be used to assist other devices in monitoring network traffic and capturing data of interest. It is the need to have ports that can operate in conjunction with other ports that has led to the development of boxes, such as box 200 that support a certain number of blades which in turn support a certain number of ports. Protocol analyzer 200 thus has multiple ports, analyzers, and capture buffers that can be used to collectively capture and analyze data that is transmitted on different data links in a network, such as network 100, or in different channels in the network.

Each blade supports a plurality of ports, such as two, four, or eight. The blade 210, for example, includes or supports the ports 211, 212, 213, 214, 215, 216, 217, and 218. The other blades 220, 230, and 240 of protocol analyzer box 200 similarly include or support a number of ports (as well as capture buffers and analyzer modules). The ports may be either unidirectional or bi-directional ports. Additionally as described in greater detail below, each port is preferably configured to be within a domain, or logical group of one or more ports that operate collectively.

As previously mentioned, connected to each port 211, 212, 213, 214, 215, 216, 217, and 218, are capture buffers and analyzer modules. The protocol analyzer 200 is thereby configured to enable the capture of desired data contained in the traffic of a communications network. The capture of the data may be triggered by one of the analyzer modules detecting a selected datum or event in the communications traffic, such as one or more statistical characteristics of that data. One such embodiment of detecting statistical data is further disclosed in copending U.S. patent application Ser. No. 10/218,343, filed Aug. 13, 2002, incorporated herein by reference.

Ports and the associated analyzer module and capture buffers perform both filtering and triggering operations. In particular, the filter operation looks for a certain type of data that it wants to capture, such as certain types of packets. In some embodiments it may look for all packets, packets that contain a certain piece of information, a certain type of packet from a certain port to another port, an error, statistical information, or other network data of interest. The filter passes all types of traffic that are not currently of interest to the analyzer while storing in a capture buffer or capturing data that is of interest.

Triggering operations generally include stopping the capture of data so that a static collection of data in the capture buffers is maintained. A trigger may be generated if selected data of interest is identified, for example, or if a capture buffer that has data stored by filtering operations becomes filled. The trigger operation may direct each port in a domain to stop immediately or to capture data for a period of time and then stop so that the capture buffer contains network data from before and after the network data of interest was identified. As further explained hereinbelow, the trigger command is generated at a single port and then communicated to each port in the domain via a serial protocol for coordinated action.

The protocol analyzer box 200 further includes, by way of example, a field programmable gate array (FPGA) 204 or other similar module. The FPGA 204 is an integrated circuit incorporating an array of programmable logic gates that are not pre-connected but where the connections are programmed electrically by the network administrator. The FPGA 204 can be used, for example, to direct various signals to various ports. The FPGA 204 is also used to program each port to a particular domain and to set the correct bits from the control signals to the appropriate port. The FPGA 204 can be programmed via another port from a processor, for example. The FPGA 204 can also coordinate the transitions between Discovery Mode and Normal Mode as well as coordinate the operation of each.

The protocol analyzer box 200 further includes inter-box communication devices, such as cable receptacles 206, 208, which are each adapted to receive a network cable, or "sync-cable," one in an upstream direction and one in a downstream direction. The cable receptacles 206, 208 may comprise, for example, RJ-45 jacks. Each cable carries control signals between adjacent boxes in a serial connection as described herein. Exemplary control signals include, but are not limited to, a data in signal 260, a data out signal 262, a clock in signal 258, and a clock out signal 256. The data in signal 260 and data out signal 262 may further include various component signals, for example, a run signal, a stop signal, a trigger signal, and a box discovery signal. As further described hereinbelow, each of the run, stop, trigger, and box discovery data signals can be included within a single protocol. Although the data in signal 260 and data out signal 262 are communicated via box to box communication, the data signals are particular to specific domains. In addition, it will be understood by those skilled in the art that the use of cable receptacles 206, 208 and accompanying cables can be replaced by wireless communications devices.

Each port can generate a trigger signal, which indicates that a trigger event or condition has occurred. After the trigger signal is generated, it is transmitted to each port in the domain across the connected boxes so that each port will respond as desired, typically capturing a specified range of communications for analysis, as previously mentioned.

Figure 3:
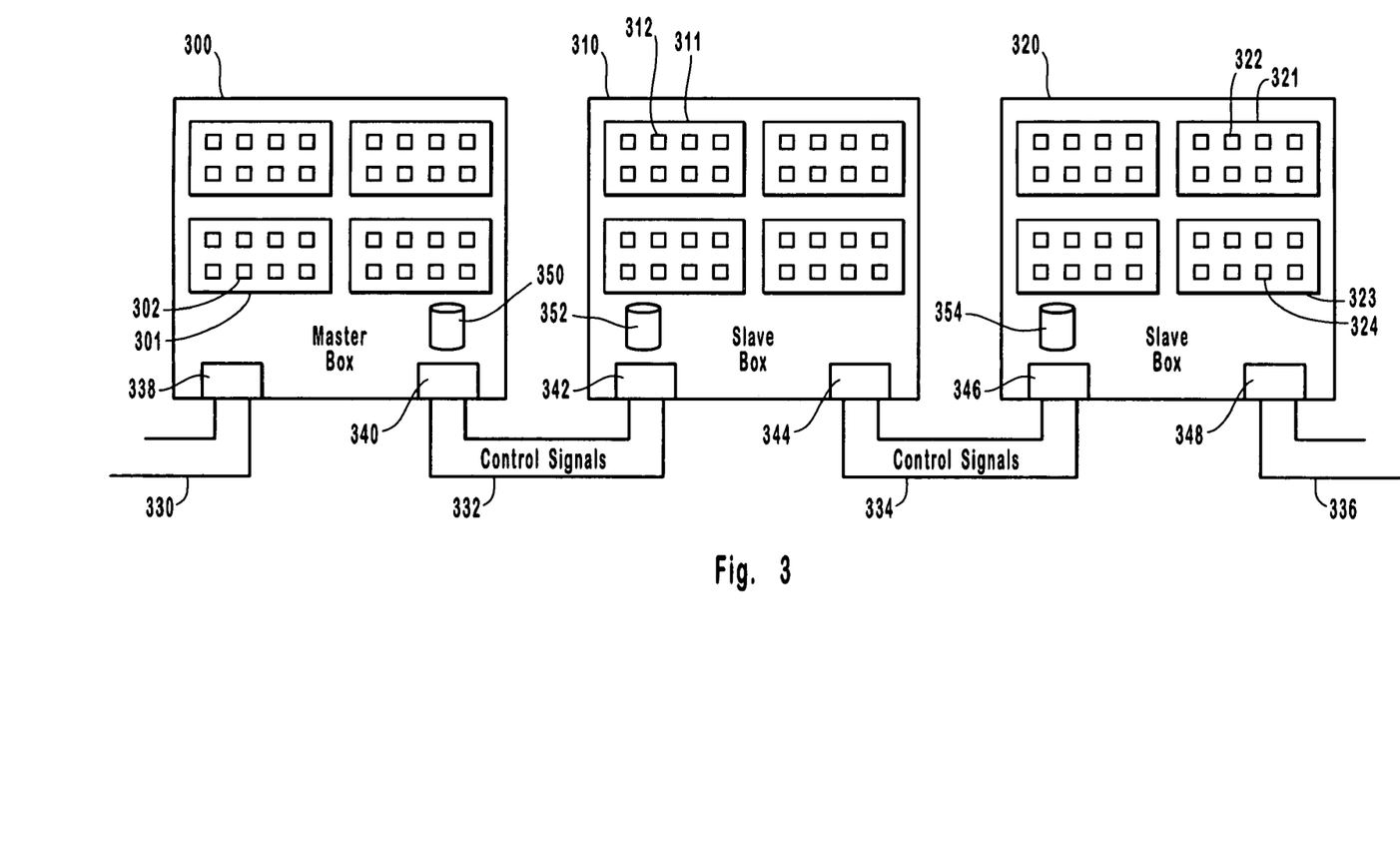
FIG. 3 is a diagram representing a multi-box system according to embodiments of the invention.

Protocol analyzer box 200 may include an oscillator or clock 280 that operates at a certain frequency (such as 50 MHz) to generate a clock signal that is propagated to the other protocol analyzer box in the chain. Because the ports can often support a high data rate, the clock signal of the clock 280, is multiplied by the clock multiplier 290 and the resulting clock signal of the clock multiplier is used to drive time stamp counters of each port of each blade within the chassis. Each time stamp counter of each port is thus driven by the multiplied clock signal generated by the clock multiplier 290. The clock signals are transmitted as a clock out signal 256 and a clock in signal 258. The clock out signal 256, for example, is typically generated by a master box and is sent to one or more slave boxes (as shown in FIG. 3). The clock in signal 258 may be used to run the counter 270. The clock in signal 258 may refer to the clock signal that is received from a previous master or slave box (shown in FIG. 3). The master box sends the clock to the first slave box, which in turn receives the clock and passes it on to the next slave box, if any, and so forth.

In various embodiments it may be preferable to have different clocks operating for box-to-box communication and for port-to-port communication. For example, the master box can generate a 50 MHz clock signal that will be used by all boxes for box-to-box communication. A 100 MHz timestamp clock may in turn be generated for the port-to-port communication.

Each box may be isolated or serially connected to other boxes via the sync-cables. Accordingly, FIG. 3 is a block diagram that illustrates a series of boxes that are connected by sync-cables 330, 332, 334, 336 in a particular topology. In one example, the sync-cables connect to each box using RJ-45 connectors which connect with RJ-45 jacks 338, 340, 342, 344, 346, 348 in each box. The sync-cables carry the control signals from one box to the next. For example, the box 300 is connected with the box 310 by the cable 332 and the box 310 is connected to the box 320 by the cable 334. Sync-cables 330 and 336 illustrate that the box chain may be extended in either direction. The boxes 300, 310 and 320 are not required to be co-located. Software can be used to detect any illegal connection, such as braches or loops in the box topology.

Referring again to FIG. 2, each box includes a delay register 272 that can be programmed with the transmission latency between the various boxes in a chain. The delay register itself may reside in the FPGA 204, or it may be implemented in hardware external to the FPGA. These latencies are predictable and can therefore be experimentally determined and stored in the delay register. The delay register 272 is then referred to each time an incoming or outgoing control signal indicates that a selected activity should be performed. The delay register informs the box how long it should delay before implementing the activity so that each box can synchronously perform the selected activity rather than at delays corresponding to transmission latencies. In some cases it may be desirable to delay only certain signals using the delay register, while other signals are acted upon immediately after being received.

In an alternative embodiment of the invention the box generating a control signal has a register that indicates how long each box should delay depending on the source of the control signal. Delay values particular to each box are then attached to the control signal such that each box receiving the control signal does not have to access a delay register in that box. Rather, all the delays are set by the box originating the control signal.

Each group of connected boxes can be configured as one or more than one sync-group. During normal operation, the most upstream box in a sync-group is designated as a master and has nothing connected to its upstream incoming cable receptacle (unless there is an upstream sync-group). Downstream boxes in a sync-group are designated to be slaves.

If the chain is logically broken into multiple chains, or sync-groups, no communication takes place between the sync-groups. This is accomplished via a control register in each box that specifies whether incoming information is to be ignored from either the upstream or downstream box. The most upstream box (which should be a master, otherwise it cannot be used), should be configured to ignore any information from its upstream side. Likewise, the most downstream box in a sync-group should be configured to ignore any information from its downstream side. Each master box, whether it is the most upstream box or not, is configured to ignore any information from its upstream side. This guarantees that each sync-group is isolated from each other and that any chains that are in Normal Mode are not interfered with should additional box(es) be added to the beginning or end of a chain.

As illustrated by example in FIGS. 2 and 3, an illustrative box can support up to four blades and each blade can support up to eight ports. A "domain" refers to a group of ports that are bundled or logically connected together, and generally represents the number of simultaneous users that may use different ports within the sync group. The number of domains that may be supported in each sync group is limited only by the hardware resources available, but may be chosen such as to meet user requirements. One embodiment, for example, may include chassis that support 8 domains in each sync group. Any port in any box in a sync-group can be in any one of the domains. Because the boxes or blades are not necessarily of the same technology, it is possible to have different types of ports within a single domain.

Referring again to FIG. 3, depicted is a domain of ports. The domain illustrated in FIG. 3 includes the port 302 from a blade 301 of the box 300, a port 312 from a blade 311 of the box 310, a port 322 from the blade 321 of the box 320, and a port 324 from a blade 323 of the box 320. The domain illustrated by FIG. 3 thus shares ports that are located on different blades of different boxes.

For a given domain, there. is typically a master box, illustrated in FIG. 3 as box 300. Methods as disclosed herein can determine which boxes and/or ports are available to a network and connected. A determination is also made as to which box is the master box and which box(es) are slave boxes, illustrated in FIG. 3 as boxes 310 and 320.

In one embodiment of the invention run and trigger information can be communicated between boxes in a data packet or frame of a protocol. As defined herein, a "protocol" refers to a defined set of rules or formats that nodes in a telecommunication or computer network use when they communicate. Both nodes must recognize and observe the protocol. The protocol will include individual data fields that identify the protocol and designate activity for each domain. The data fields have different meanings depending on the mode and operation of the system.

Each box includes a delay register 350, 352, 354 that may be programmed with the transmission latency between the various boxes in the chain. These latencies are predictable and can therefore be experimentally determined and stored in each delay register. The delay registers are then referred to each time an incoming or outgoing control signal indicates that a selected activity should be performed. The delay registers inform each box how long it should delay before implementing the activity so that each box can synchronously perform the selected activity rather than at delays corresponding to transmission latencies.

Figure 4:
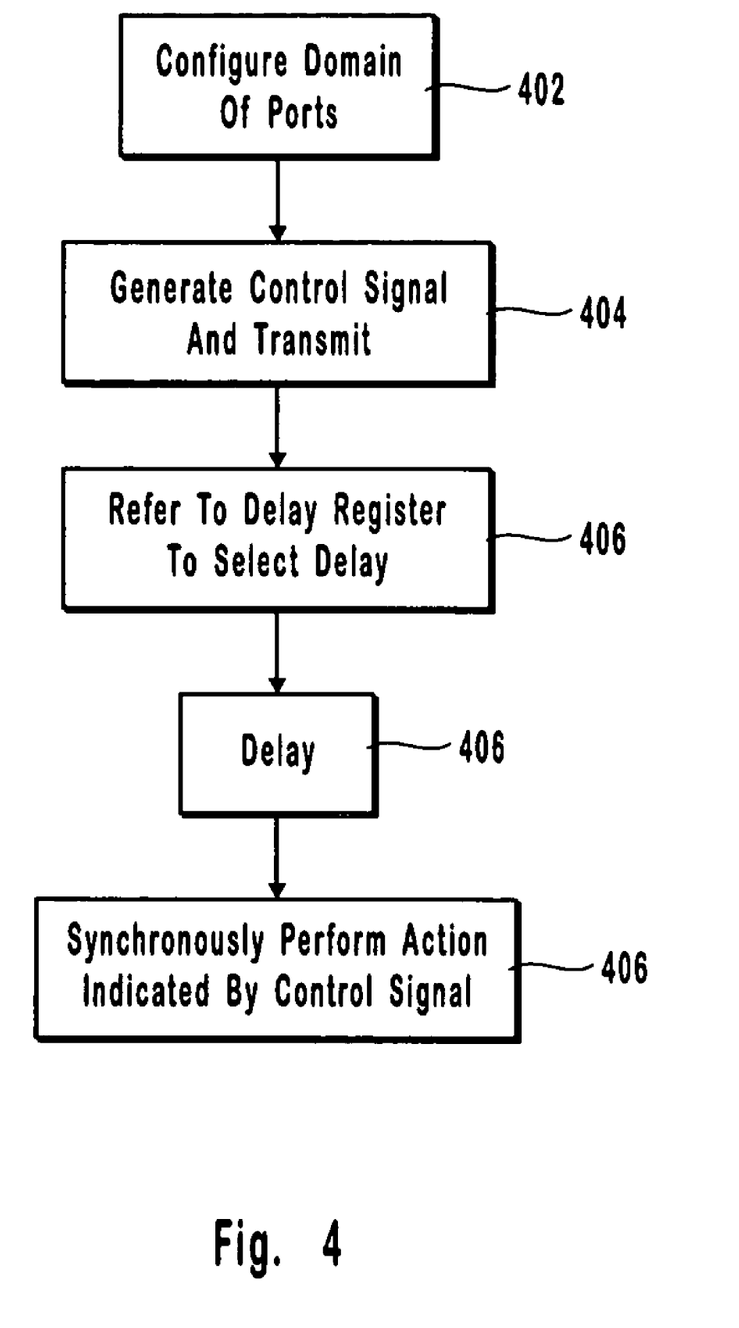
FIG. 4 is a diagram representing illustrative methods according to embodiments of the invention.

Referring now to FIG. 4, one illustrative method of synchronously operating ports in a protocol analyzer system is depicted. Initially, a domain of ports is configured with the domain being distributed over multiple boxes, as indicated by block 402. This act may be performed well in advance of the remaining steps such that the configuration of the domain is preset and can be used repeatedly. Next, at one of the ports in the domain or through another device a control signal is generated. As previously indicated, such control signals may include run, stop, and trigger signals, as indicated by block 404. The control signal is propagated to each box having a port in the domain. Each box then refers to a delay register to select an applicable delay before implementing the action indicated by the control signal, as indicated by block 406. The applicable delay reflects the time required to transmit the control signal to each box and enable synchronous action. Thus, after each box delays, as indicated by block 408, each box synchronously performs the action indicated by the control signal, as indicated by block 410.

Figure 5:
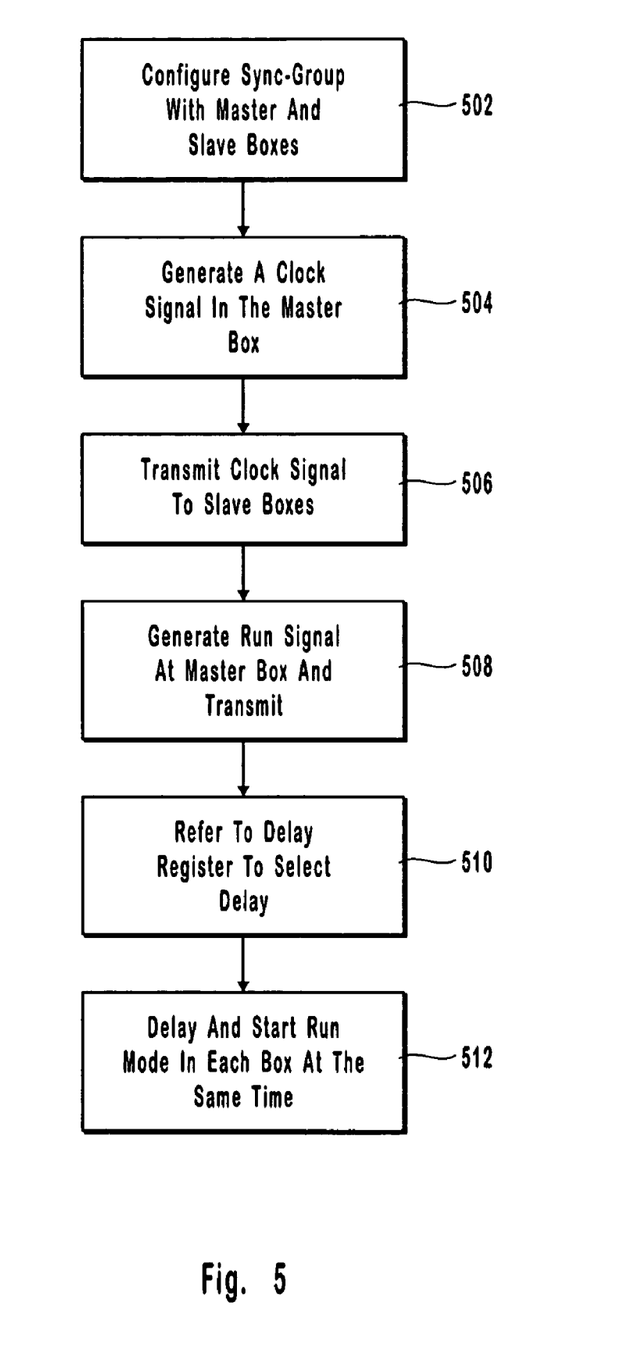
FIG. 5 is another diagram representing illustrative methods according to embodiments of the invention.

Referring now to FIG. 5, another illustrative method of synchronously operating ports in a protocol analyzer system is depicted. Initially, a sync-group is configured with a master box and at least one slave box, as indicated by block 502. A domain of ports may also be configured at this time, with the ports being distributed across the sync-group as desired.

A clock signal is then generated in the master box, as indicated by block 504. The clock signal is propagated to each port in the sync-group and may be used to run counters in each of the boxes in the sync-group, as indicated by block 506. The counters are used to time stamp data stored in capture buffers so that, once data has been captured and the trigger has occurred, a network administrator can identify the time of each captured datum. The delay registers are then used to account for the transmission delay of the signals between each chassis in the sync group, which synchronously starts each of the counters in each of the ports. Since the timestamps in each of the ports will now be the same, the network administrator can look at all of the data captured at the same time from all the ports in the domain, and can then correlate events that are seen on different ports.

Each box refers to a delay register to select an applicable delay before starting the run mode, as indicated by block 510. The applicable delay reflects the time required to transmit the control signal to each box and enable synchronous action. Thus, after each box implements the indicated delay, each box synchronously starts the run mode, as indicated by block 512.

It will be understood that other actions and methods disclosed herein but specifically identified in FIGS. 4 and 5 are also within the scope of the invention and may be combined with the above described methods.

Related inventions in which the protocol analyzer boxes are operated in a "Discovery Mode" to discover and configure multiple ports over one or more boxes into respective domains and sync-groups are described in U.S. patent application Ser. No. 10/868,631, entitled "Discovery and Self-Organization of Topology in Multi-Chassis Systems," filed Jun. 14, 2004, and claiming the benefit of Provisional Application No. 60/479,735; both of which are incorporated herein by reference. Other related embodiments in which the configured sync-groups are operated in the "Normal Mode" by which a serial protocol is used to transmit run, stop, and trigger data between serially connected network protocol boxes to effect coordinated triggering to capture network data of interest are described in Ser. No. 10/881,620, entitled "Propagation of Signals Between Devices for Triggering Capture of Network Data" filed Jun. 30, 2004, and claiming the benefit of Provisional Application No. 60/484,208; both of which are incorporated herein by reference.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a system that includes a plurality of boxes, a method for synchronizing activity within ports of a domain, the method comprising:
   a) experimentally determining and recording in a delay register of a first one of the boxes a transmission latency of signals reflecting time required to transmit a control signal from the first box to a second one of the boxes;
   b) after recording the transmission latency in the delay register, generating a control signal at the first box that implements capturing data from network communications traffic for analysis at each of a first port and a second port, wherein the first port is connected between a first two nodes in a network and located in the first box, and the second port is connected between a second two nodes in the network and located in the a second box, wherein each box of the plurality of boxes includes one or more blades and each blade has one or more ports;
   c) receiving the control signal at the second box;
   d) using the transmission latency recorded in the delay register in the first box to delay implementation of capturing data from between the first two nodes at the first box to occur at the same time as implementation of capturing data from between the second two nodes at the second box; and
   repeating steps b) to d) for another control signal that implements halting the capture of data at the first and second ports.

2. A method as defined in claim 1, wherein the control signal includes one or more of a run signal, a stop signal, and a trigger signal.

3. The method as in claim 1, wherein the control signal triggers a first capture buffer in communication with the first port and a second capture buffer in communication with the second port to each capture a selected portion of the communications traffic received through each port.

4. A method as defined in claim 2, further comprising, prior to generating a control signal at a first box, detecting a trigger event at a particular port, wherein the trigger signal is asserted.

5. The method as in claim 1, further comprising delivering the control signal using a serial protocol, wherein a field programmable gate array at each box analyzes the serial protocol to identify which ports the control signal is directed to.

6. The method as in claim 1, further comprising generating a clock signal in a master box and propagating the clock signal to at least one additional box via cables that are in communication with each box.

7. The method as in claim 1, wherein the control signal is delivered using a serial protocol, wherein the control signals coordinate the operation of each of the first port and the second port.

8. The method as in claim 1, wherein: each blade further comprises a capture buffer in communication with each port and the control signal comprises a trigger signal that is generated at a port when the port's associated capture buffer is full; and the trigger signal is propagated to each port in the domain and acts to stop the capture of data in the capture buffer associated with each port in the domain.

9. The method as in claim 1, wherein: the control signal comprises a run signal delivered using a serial protocol to place each of the first port and the second port in a run mode whereby: communications traffic is received through each of the first port and the second port and routed to analyzer modules in communication with each of the first port and the second port; and the communications traffic is monitored by the analyzer modules to identify data of interest.

10. A method as defined in claim 1, further comprising generating a clock signal in the first box and transmitting the clock signal to each of the first box and the second box, whereby a counter in each box runs at the rate of the clock signal, or a multiple of the rate of the clock signal.

11. A method as defined in claim 1, wherein the control signal includes a delay component that indicates a period of time that the second box should delay before implementing the selected activity.

12. In a protocol analyzer system in a computer network, a method for synchronously performing capturing data from network communications traffic for analysis on each of multiple boxes within the protocol analyzer system, the method comprising:
  configuring a plurality of the ports from a plurality of the boxes in the protocol analyzer system into a domain, wherein at least two of the ports in the domain are located in different boxes and are connected between different sets of nodes in the network and, wherein each of the multiple boxes includes one or more blades and each blade has one or more ports;
  experimentally determining and recording in a delay register of a first box having a port in the domain a transmission latency of signals reflecting corresponding times required to transmit a control signal between the first box and each of the other boxes;
  after recording the transmission latencies in each delay register, generating a control signal at one of the ports in the domain, the control signal being capable of implementing capturing data from between different sets of nodes at each port in the domain, wherein the control signal includes one or more of a run signal, a stop signal, and a trigger signal;
  propagating the control signal to each box having a port in the domain; and
  using the transmission latency recorded in the delay register of the first box to delay implementation of the capturing of data from between sets of nodes at each port in the domain to ensure the capturing of data from between sets of nodes is implemented synchronously.

13. A method as defined in claim 12, further comprising, prior to generating a control signal at one of the ports in the domain, detecting a trigger event at the port, wherein the control signal comprises a trigger signal.

14. The method as in claim 12, further comprising delivering the control signals using a serial protocol, wherein a field programmable gate array at each box analyzes the serial protocol to identify which ports the control signal is directed to.

15. The method as in claim 12, further comprising generating a clock signal in one of the boxes and propagating the clock signal to at least one additional box, wherein each box that generates or receives the clock signal has a counter that runs at the rate of the clock signal or a multiple of the rate of the clock signal, the clock signal used to generate time stamps in a capture buffer in communication with each port.

16. The method as in claim 12, wherein the control signal is delivered using a serial protocol, wherein the control signals coordinate the operation of each port in the domain of ports.

17. The method as in claim 12, wherein:
  each blade further comprises a single capture buffer in communication with each port and the control signal comprises a trigger signal that is generated at a port when the port's associated capture buffer is full; and
  the trigger signal is propagated to each port in the domain and acts to stop the capture of data in the capture buffer associated with each port in the domain.

18. The method as in claim 12, wherein the control signal comprises a run signal delivered using a serial protocol to place the domain of ports in a run mode whereby: communications traffic is received through the domain of ports; and the communications traffic is monitored by analyzer modules in communication with the domain of ports to identify data of interest.

* * * * *